Patented May 29, 1923.

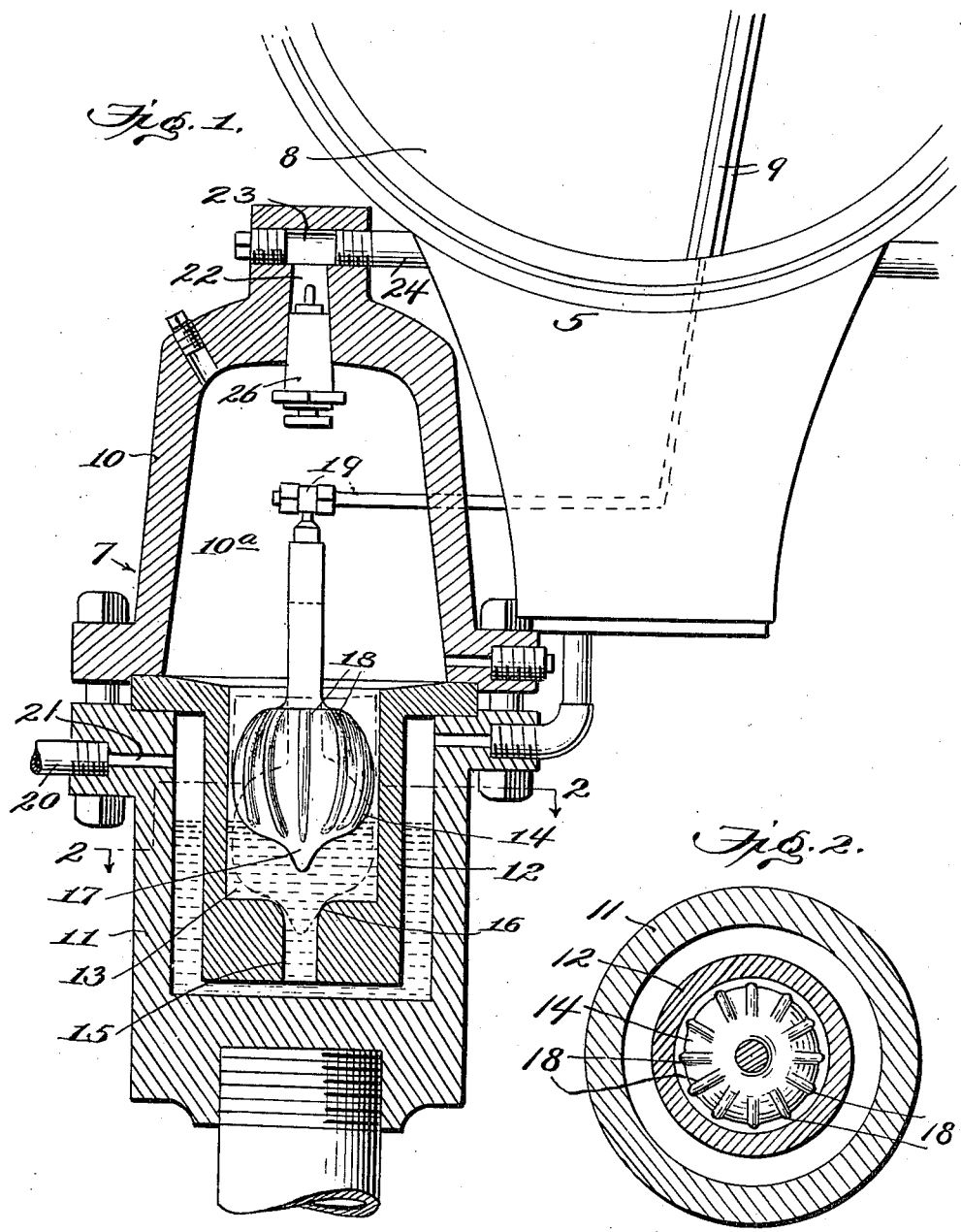

1,457,201

UNITED STATES PATENT OFFICE.

HENRY P. WESTCOTT, OF ERIE, PENNSYLVANIA.

DIFFERENTIAL-PRESSURE GAUGE.

Application filed October 20, 1919. Serial No. 332,063.

*To all whom it may concern:*

Be it known that I, HENRY P. WESTCOTT, a citizen of the United States, residing at Erie, in the county of Erie and State of Pennsylvania, have invented new and useful Improvements in Differential - Pressure Gauges, of which the following is a specification.

This invention relates to a float check valve for use particularly with recording differential and static pressure gauges for gas lines and especially gas lines having an orifice meter installed therein of well known form, as disclosed in the prior art of the type illustrated in my Patent No. 1,172,087, February 15, 1916, and the patent to G. X. Wittmer, No. 716,973, December 30, 1902, and the essential object in view is to prevent the mercury being blown out backwardly from the mercury float chamber or pot whenever the pressure on the down stream or normal low pressure side exceeds the pressure on the up stream or normal high pressure side. This excess pressure condition on the down stream side relatively to the up stream side is not usual but has happened and will occur when a line is broken between the meter and the well or supply source, or when the well is shut in and the operator blows the drip located between the meter and the well.

The invention consists in the construction and arrangement of parts which will be more fully hereinafter described and claimed.

In the drawing:—

Fig. 1 is a sectional elevation of portions of a pressure gauge showing the improved float check valve applied thereto and shown in two positions in full and dotted lines.

Fig. 2 is a horizontal section taken in the plane of the line 2—2, Fig. 1.

The improved valve is shown applied in the present instance to a recording static pressure gauge 5 and is operatively associated with a mercury float organization of a differential gauge 7, more fully hereinafter described, the organization of these parts being such that a record will be made both as to static and differential pressure on one chart 8 through the medium of two hands or indices 9. The differential gauge 7 as usual is shown provided with an upper casting or cap 10 with a chamber 10ª and secured to a lower chambered casting or section 11 which is supported on a main pipe for the gas and wherein an orifice meter is mounted. The lower section or casting 11 is provided with a mercury pot 12 supplied with a quantity of mercury 13 therein and having a float 14 movably engaging the same. The mercury pot 12 has a bottom vertical opening or port 15 as usual having an upper valve seat 16, and centrally depending from and forming a part of the bottom of the float 14 is a substantially conical check valve 17. The check valve 17 and valve seat 16 have relative contours to effect a guiding sealing engagement of the valve with the seat when the float lowers in the pot 12. The float 14 movably fits within the pot 12 and to insure free centralized operation therein with minimized friction, it is formed with corrugations or ribs 18 which contact with the inner surface of the side wall of the pot. This combined float and check valve constitutes the essential feature of the present improvement, and as heretofore indicated the mercury is prevented from being blown out backwardly from the float chamber or pot 12 through the opening or port 15 when the pressure on the down stream or normal low pressure side exceeds the pressure, or the normal high pressure, on the up stream side. When this excess pressure on the down stream side is effective the float 14 lowers in the pot 12 and the check valve 17 engages the valve seat 16 and thereby seals the bottom of the pot and prevents the mercury being blown out through the opening or port 15.

The upper end of the float 14 is connected to a lever 19 extending into the lower portion of the pressure gauge 5 in a well known manner and for a purpose fully understood. The lower casting or section 11 has an outlet pipe 20 attached thereto and in practice will extend to and have communication with the main pipe, or, the up stream side of the orifice meter. As shown the pipe 20 has communication with an upper bore 21 opening into the chamber of the lower casting or section 11. At the center of the top of the cap or upper casting 10 is a vertical central outlet bore 22 which is partially screw threaded and intersected by a cross bore 23 having an outlet pipe 24 adapted to be connected to the record pressure gauge 5 having in practice a connection with an orifice meter as disclosed by my patent aforesaid. The lever 19 having the float 14 attached thereto is free to move vertically within the chamber 10ª of the top cap or casting 10 directly below the bore 22. The latter features of construction are generally well known in the art of gauges of this type with the exception of the particular construction of the bore or outlet 22. The bore or outlet 22 is also shown engaged by an automatic valve 26 forming the essential subject matter of my Patent No. 1,385,234 of July 19, 1921, this latter valve being automatically closed by the lever 19 and upper end of the float 14 and preventing the mercury being blown out of the pot 12 and through the chamber 10ª and bore or outlet 22 when the differential pressure becomes excessive or is greater than the maximum recording range of the gauge 5 when the float 14 and lever 19 will be thrown upwardly. After the differential pressure becomes normal, or, within the range of the gauge 5, the mercury will fall back into the pot 12 without loss. So also the present improvement or combined check valve and float will prevent loss of mercury through the bottom opening or port 15 when the pressure on the down stream or normal low pressure side exceeds the pressure on the up stream side. By means of these dual check valves provision is made to prevent the loss of mercury under the excess pressure conditions indicated. Though the present improvement involves more particularly the combined float and check valve in the mercury pot, in a general sense it contemplates the provision of means for preventing the loss of mercury from the pot therefor under counteracting excess pressures at any point and a consequent saving or economical use of mercury and avoidance of frequent personal attention to maintain the mercury pot supplied with the necessary charge of mercury. It will also be seen that the use of springs or delicate parts is avoided in the organization of the float check valve as well as the upper check valve in the port 22, and hence there will always be a constantly reliable action or operation of these valves without the possibility of material leakage or repair requirement.

What is claimed is:—

1. In a gauge of the class specified, the combination with a chambered casing having a dome thereover, a mercury pot mounted in the chambered casing and provided with a bottom opening and a fully open top portion, a metal float mounted in said pot and having a lower depending tapering check valve fixed thereto to extend into the said opening in the bottom of the pot, the check valve having a stem rising from the upper portion thereof, gauge means to which the stem is operatively connected, and valve means located above the float and stem and with which the upper part of the float stem is adapted to contact to open said valve means.

2. In a gauge of the class specified, the combination with a chambered casing having a dome thereover, a mercury pot mounted in the said chambered casing and provided with a bottom having a central opening and a fully open top portion, the dome having an outlet opening with a valve mounted therein, and a metal float mounted to move in the mercury pot to engage the mercury and having a bottom centrally depending check valve member shaped to extend into and close the opening in the mercury pot on the downward movement of the float, the float having a stem rising from the upper portion thereof adapted to be connected to gauge mechanism, the valve at the dome being opened by the upward movement and contact therewith of a part of the float.

3. In a gauge of the class specified, a chambered section having a dome thereover with an outlet and valve therein, the chambered section being also provided with an inlet connection, a mercury pot mounted in the chambered section and having a bottom with a central opening therethrough and an upper fully open top portion, the opening in the bottom of the pot being formed with an upper valve seat, and a metal float loosely mounted in the pot and having a diametrical extent slightly less than the diameter of the portion of the pot in which it is mounted for positive engagement therewith of the mercury to set up a certain operation of the float, the float being provided with a central depending check valve in the bottom thereof and forming a part of the same and operative to move into the said opening, the side of the float having corrugations extending downwardly thereover from the upper to the lower portion.

In testimony whereof I have hereunto set my hand in presence of two subscribing witnesses.

HENRY P. WESTCOTT.

Witnesses:
  W. H. KAISER,
  A. B. GALLAGHER.